United States Patent
Tachiiwa et al.

(10) Patent No.: US 10,077,795 B2
(45) Date of Patent: Sep. 18, 2018

(54) NUT MEMBER

(71) Applicants: KOITO MANUFACTURING CO., LTD., Tokyo (JP); NIFCO INC., Yokosuka-shi, Kanagawa (JP)

(72) Inventors: Takeyuki Tachiiwa, Shizuoka (JP); Yuji Shibata, Yokosuka (JP)

(73) Assignees: KOITO MANUFACTURING CO., LTD., Minato-ku, Tokyo (JP); NIFCO INC., Yokosuka-shi, Kanagawa (JP)

( * ) Notice: Subject to any disclaimer, the term of this patent is extended or adjusted under 35 U.S.C. 154(b) by 0 days.

(21) Appl. No.: 15/296,663

(22) Filed: Oct. 18, 2016

(65) Prior Publication Data
US 2017/0108027 A1 Apr. 20, 2017

(30) Foreign Application Priority Data
Oct. 20, 2015 (JP) .................................. 2015-206384

(51) Int. Cl.
*F16B 37/04* (2006.01)
*B60Q 1/068* (2006.01)

(52) U.S. Cl.
CPC .......... *F16B 37/043* (2013.01); *B60Q 1/0683* (2013.01); *F16B 37/04* (2013.01)

(58) Field of Classification Search
CPC ........ F16B 21/08; F16B 37/04; F16B 37/043; F16B 37/065; F16B 37/122; F16B 37/145; B60Q 1/0683
USPC ........ 411/172–173, 182–183, 431, 508–509; 362/507, 516
See application file for complete search history.

(56) References Cited

U.S. PATENT DOCUMENTS

| | | | | | |
|---|---|---|---|---|---|
| 2,649,884 | A | * | 8/1953 | Westover | F16B 37/043 411/173 |
| 2,788,047 | A | * | 4/1957 | Rapata | F16B 37/041 411/182 |
| 2,936,015 | A | * | 5/1960 | Rapata | F16B 5/0233 174/138 D |

(Continued)

FOREIGN PATENT DOCUMENTS

| JP | S59-128923 U | 8/1984 |
|---|---|---|
| JP | S60-026107 U | 2/1985 |

(Continued)

OTHER PUBLICATIONS

Communication dated May 1, 2018, from Japanese Patent Office in counterpart application No. 2015-206384.

*Primary Examiner* — Roberta S Delisle
(74) *Attorney, Agent, or Firm* — Sughrue Mion, PLLC

(57) ABSTRACT

A nut member 10 facilitates an adjustment of the optical axis of a light, has excellent handleability, and includes a flange portion 11 to be supported by an attachment portion 6 disposed on the back side of a vehicle lamp member 1, and a leg portion 15 protruding to the front from the flange portion 11 and to be elastically deformed and fastened to the attachment portion 6, the lamp member 1 having an optical axis 100 to be adjusted by handling a screw 8 inserted into an insertion hole 22 formed over from an inside of the flange portion 11 to the leg portion 15. Before an insertion of the screw 8, a screw thread 14 of a female screw portion 13 has been formed on an inner surface of a flange insertion pass (insertion hole 22) to extend one round in a circumferential direction.

11 Claims, 3 Drawing Sheets

(56) References Cited

U.S. PATENT DOCUMENTS

| | | | | |
|---|---|---|---|---|
| 2,956,605 A * | 10/1960 | Rapata | ................ | F16B 37/041 |
| | | | | 411/531 |
| 3,505,922 A * | 4/1970 | Tinnerman | ............ | F16B 37/043 |
| | | | | 411/182 |
| 3,508,593 A * | 4/1970 | Gill | ..................... | B60Q 1/0683 |
| | | | | 411/182 |
| 3,624,867 A * | 12/1971 | Reynolds | .............. | B23P 19/062 |
| | | | | 206/345 |
| 4,240,323 A * | 12/1980 | Kojima | ................ | F16B 37/043 |
| | | | | 411/15 |
| 4,503,486 A * | 3/1985 | Makita | ................ | B60Q 1/0683 |
| | | | | 362/284 |
| 4,579,492 A * | 4/1986 | Kazino | ................ | F16B 37/043 |
| | | | | 411/15 |
| 5,046,904 A * | 9/1991 | Malinow | ................ | F16B 5/025 |
| | | | | 411/15 |
| 5,746,559 A * | 5/1998 | Shirai | ................ | B60Q 1/0683 |
| | | | | 362/421 |
| 8,016,530 B2 * | 9/2011 | Johnson | ................ | F16B 37/043 |
| | | | | 411/173 |
| 2013/0094923 A1 | 4/2013 | Branning et al. | | |

FOREIGN PATENT DOCUMENTS

| | | |
|---|---|---|
| JP | S60-168201 U | 11/1985 |
| JP | H06-041009 U | 5/1994 |
| JP | H09-014244 A | 1/1997 |
| JP | 2014-32742 A | 2/2014 |
| WO | 2015/072490 A1 | 5/2015 |

\* cited by examiner

NUT MEMBER

BACKGROUND OF THE INVENTION

1. Field of the Invention

The present invention relates to a nut member that supports and adjusts, for example, a vehicle light.

An adjustment mechanism for adjusting the optical axis of existing lights, such as vehicle headlamps or fog lamps (hereinafter referred to as "lamp members"), includes a screw which is a male screw, and a self-locking nut serving as a female screw, on its back side (see PTL 1, below). The self-locking nut includes a flange and leg pieces. The flange has an axial hole penetrating therethrough. The leg pieces of the self-locking nut are fastened to and the flange of the self-locking nut is supported on the back side of a reflector of a lamp member and a screw is pushed into the axial hole. While the screw is pushed into the axial hole, the screw helically cuts the inner circumferential surface of the axial hole using its screw thread to engrave a female screw on the inner circumferential surface of the axial hole. When the screw is rotated in this state, the self-locking nut moves back and forth relative to the screw. The movement of the self-locking nut changes the angle of the reflector, whereby the optical axis of the lamp member is adjusted.

2. Description of the Related Art

[PLT] Japanese Unexamined Patent Application Publication No. 2014-32742

As described above, however, in this adjustment mechanism, a female screw is engraved on the inner circumferential surface of the axial hole as a result of the screw thread of the screw helically cutting the inner circumferential surface of the axial hole. Thus, chips may accumulate in and adhere to the axial hole. When the optical axis is adjusted in this state, the chips may hinder the screw from rotating and increase torque of the screw, so that the adjustment of the optical axis may be rendered difficult.

SUMMARY OF THE INVENTION

The present invention was made in view of such circumstances. Specifically, an object of the present invention is to provide a nut member that facilitates an adjustment of the optical axis of a light and that is easily handleable.

To achieve the above object, a nut member according to the present invention includes a flange portion to be supported by a vehicle light, and a leg portion protruding toward a first side from the flange portion and is to be elastically deformed and fastened to the vehicle light, the vehicle light having an optical axis adjusted by handling the male screw member inserted into an insertion hole formed over from an inside of the flange portion to the leg portion. A female screw portion has been formed in the insertion hole before an insertion of the male screw member into the insertion hole.

The nut member according to the present invention is characterized in that the female screw portion has a screw thread extending one round in a circumferential direction.

The nut member according to the present invention is characterized in that a protrusion protruding from the leg portion toward the insertion hole is formed along an axial direction of the insertion hole.

The nut member according to the present invention is characterized in that a guide portion by which the male screw member is to be guided is disposed on a second side of the flange portion.

The nut member according to the present invention is characterized in that a groove formed in an inner side of the leg portion extends in an axial direction of the insertion hole and is open at an end of the insertion hole.

A nut member according to the present invention has the above-described configuration. Specifically, the insertion hole has had a female screw portion from the completion of the insertion hole. Thus, the male screw member is screwed on the female screw portion while being guided by the female screw portion. Thus, the nut member can achieve excellent handleability at the time of attachment. In addition, the female screw portion is formed not as a result of the male screw member cutting the inner circumferential surface of the insertion hole. Thus, chips are less likely to be produced. Without adhesion of chips, the male screw member is smoothly rotated and the optical axis of a light can be easily adjusted. Thus, the nut member is easily handleable at the time of readjustment after the nut member has been attached to the light.

In a nut member according to the present invention, a screw thread of a female screw portion extends one round in a circumferential direction. In this configuration, chips, if produced, are smoothly discharged without adhesion, so that the male screw member is smoothly rotated and the optical axis of the light can be easily adjusted. In addition, since the female screw portion has only one screw thread, the screw thread can be easily formed with a small number of split dies if the direction in which the dies are split is set to be an axial direction of the insertion hole.

In a nut member according to the present invention, a protrusion, which protrudes from each leg portion toward an insertion hole, extends in an axial direction of the insertion hole. In this configuration, the male screw member inserted into the insertion hole is guided by the protrusion, so that the male screw member keeps the torque constant at such a level that the rotation of the male screw member is not hindered. Thus, the nut member is stably handled and can realize excellent handleability. In the insertion hole, the protrusion comes into contact with the male screw member but portions around the protrusion except the protrusion do not come into contact with the male screw member, so that chips are less likely to occur. Without adhesion of chips, the male screw member is rotated smoothly, so that the optical axis of a light can be easily adjusted. The nut member can thus realize excellent handleability.

In a nut member according to the present invention, a guide portion by which the male screw member is to be guided is formed on a second side of the flange portion. Specifically, the male screw member is inserted into the insertion hole while being guided by the guide portion. Thus, the male screw member is easily insertable into the insertion hole. The nut member can thus realize excellent handleability.

In a nut member according to the present invention, a groove formed in an inner side of the leg portion is formed along an axial direction of the insertion hole and is open at the end of the insertion hole. In this configuration, chips, if produced, are accumulated in the groove and discharged from the end of the insertion hole. Without adhesion of chips, the male screw member is smoothly rotated, so that the optical axis of a light is easily adjustable. The nut member can thus realize excellent handleability.

BRIEF DESCRIPTION OF THE DRAWINGS

FIG. 1A is a sectional view of the entirety of the light, including the nut member, and FIG. 1B is a sectional view of a main portion of the nut member.

FIG. 2A is a rear perspective view of the nut member, viewed from a guide portion, and FIG. 2B is a front perspective view of the nut member, viewed from leg portions.

FIG. 3A is a rear view of the nut member viewed from the rear, FIG. 3B is a side, partially-sectioned view of the nut member viewed from the side, FIG. 3C is a front view of the nut member viewed from the front, FIG. 3D is a rear sectional view of the nut member taken along line A-A, and FIG. 3E is a sectional view of the nut member taken along line B-B.

DESCRIPTION OF THE PREFERRED EMBODIMENT

Figure 1A:
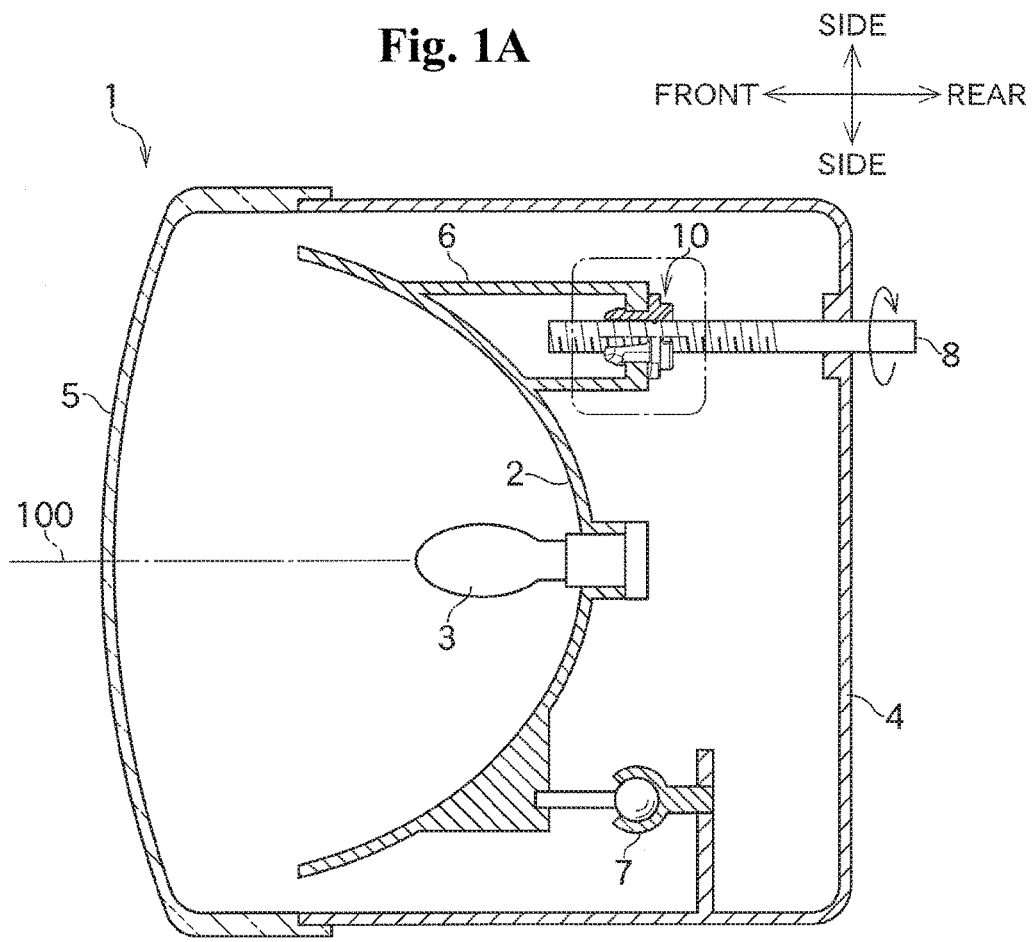
FIGS. 1A and 1B are sectional views of a nut member according to an embodiment of the present invention while being attached to a light.
Figure 1B:
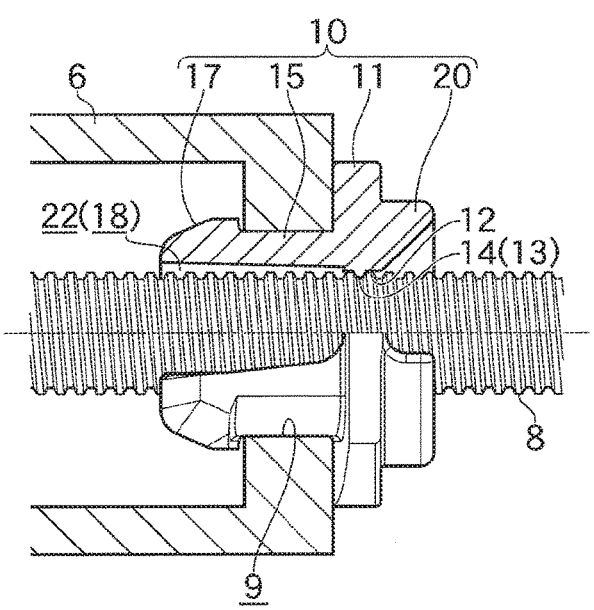

Referring to the drawings, a nut member according to an embodiment of the present invention is described below. FIGS. 1A and 1B shows a section of a nut member 10 according to an embodiment of the present invention while being attached to a lamp member 1, serving as a vehicle light.

As illustrated in FIGS. 1A and 1B, the nut member 10 is a member attached to the lamp member 1 together with a screw 8, serving as a male screw member, for adjusting an optical axis 100. Here, the lamp member 1 is so formed that a light source 3, attached to a parabolic reflector 2, is enclosed in a housing 4 and covered with a cover 5. An attachment portion 6 is disposed on the back side of the reflector 2 at a position shifted from the center of the reflector 2. A support portion 7 is disposed on the back side of the reflector 2 at another position shifted from the center and rotatably supported by the reflector 2. The nut member 10 is attached to the attachment portion 6. The screw 8, extending from the exterior through the housing 4, is attached to the nut member 10. When the screw 8 is rotated, the nut member 10 moves back and forth along the screw 8. In the following description, with reference to FIGS. 1A and 1B, the direction in which the nut member 10 moves forward relative to the screw 8 is expressed as forward (to the left in FIGS. 1A and 1B), the direction in which the nut member 10 moves rearward is expressed as rearward (to the right in FIGS. 1A and 1B), and the directions crossing the forward and rearward directions are expressed as sideward.

The nut member 10 includes a flange portion 11 supported by the attachment portion 6 of the lamp member 1, leg portions 15 protruding to the front and inserted into an attachment hole 9 of the attachment portion 6 and elastically deformed and fastened to the attachment hole 9, and a guide portion 20 protruding to the rear, the front being one of the sides in which the flange portion 11 faces, the rear being the other one of the sides in which the flange portion 11 faces. The optical axis 100 of the lamp member 1 is adjusted by handling the screw 8 inserted into an insertion hole 22 formed over from an inside of the guide portion 20 and an inside of the flange portion 11 to the leg portions 15. The adjustment of the optical axis 100 is described below.

Figure 2A:
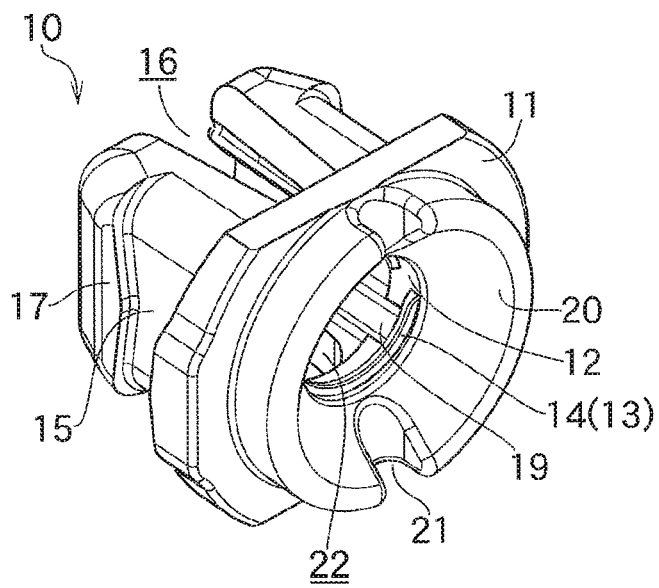
FIGS. 2A and 2B show the exterior of a nut member according to an embodiment of the present invention.
Figure 2B:
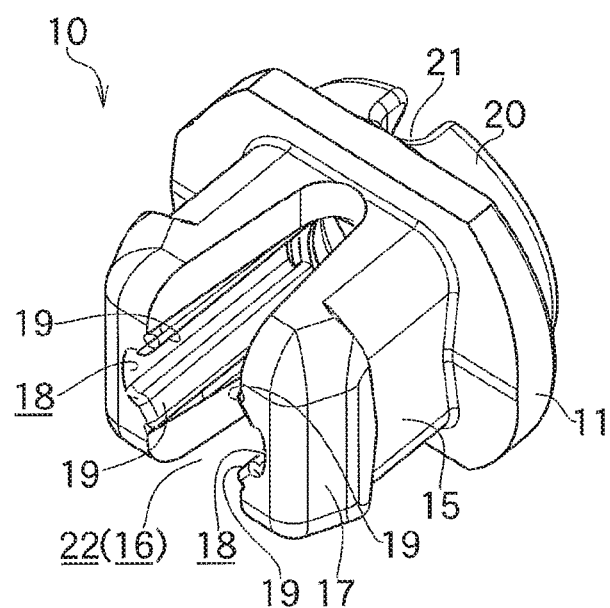
Figure 3C:
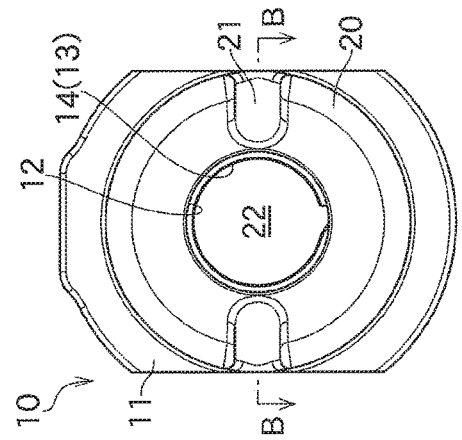
FIGS. 3A, 3B, 3C, 3D and 3E show the exterior and sections of a nut member according to an embodiment of the present invention.
Figure 3B:
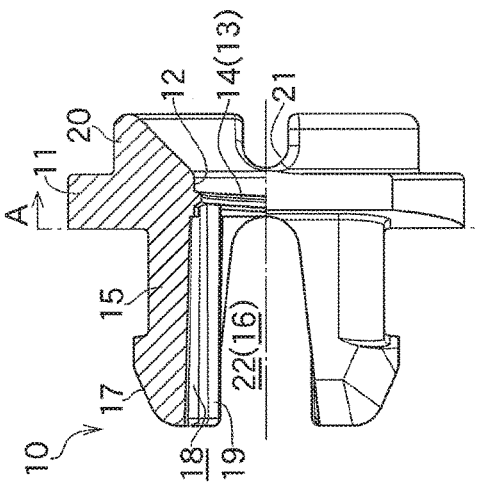
Figure 3E:
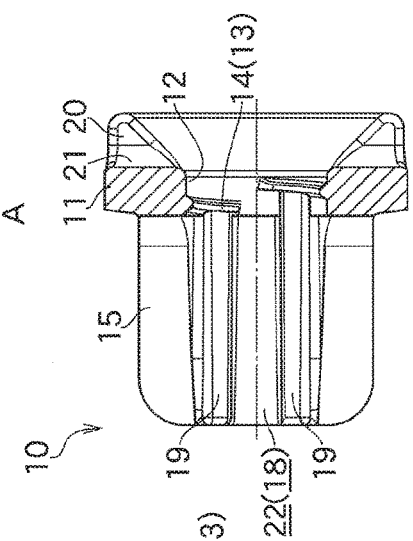
Figure 3A:
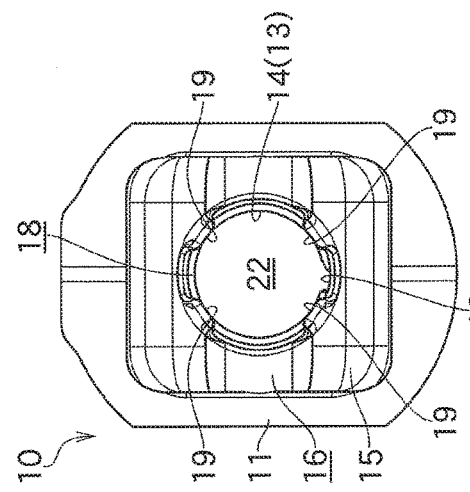
Figure 3D:
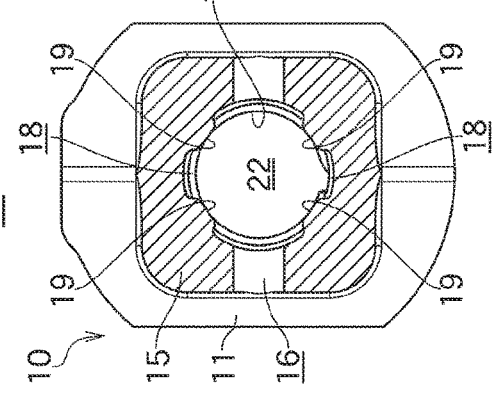

Referring to the drawings, the nut member 10 is described further in detail. FIGS. 2A and 2B show the exterior of the nut member 10 according to an embodiment of the present invention and FIG. 3 shows the exterior and the sections of the nut member 10.

As illustrated in FIGS. 2A and 2B and FIGS. 3A, 3B, 3C, 3D and 3E, the flange portion 11 has a cylindrical flange insertion pass 12 penetrating therethrough in its center portion. An insertion hole 22 is formed in an inner space of the flange insertion pass 12. The flange portion 11 protrudes sideways around the insertion hole 22. A female screw portion 13 is formed on the inner surface of the flange insertion pass 12 (in the insertion hole 22) in the state where the screw 8 has not yet been inserted. The male screw portion 13 is so formed that a screw thread 14 helically extends one round in a circumferential direction.

The leg portions 15 disposed on the front side of the flange portion 11 are a pair of leg portions disposed so as to face each other. A gap 16 is formed between the opposing leg portions 15 and the insertion hole 22 is formed in the middle of the gap 16. Each leg portion 15 is in a plate shape and a portion of the side surface of the leg portion 15 protrudes sideways to form a hook portion 17. A groove 18 concaved into the leg portion 15 is formed in the inner surface of each of the leg portions 15, facing each other, so as to longitudinally formed in a front-rear direction parallel to the axial direction of the insertion hole 22. The groove 18 in each of the leg portions 15 is open at the end of the insertion hole 22. Protrusions 19 are formed on both edges of the groove 18 in the inner surface of each leg portion 15. Each protrusion 19 protrudes from the inner surface of the leg portion 15 toward the insertion hole 22 and longitudinally formed in the front-rear direction along the axial direction of the insertion hole 22. Specifically, two protrusions 19 are formed on the inner surface of each leg portion 15 to form substantially parallel to each other in a longitudinal direction and the groove 18 is formed between these protrusions 19.

The guide portion 20 protruding to the rear of the flange portion 11 is funnel-shaped, declining toward the center of the flange portion 11 (insertion hole 22). At the circumferential edge of the guide portion 20, a pair of notches 21 are formed at such positions as to face each other. Each notch 21 has such a depth as to reach the flange portion 11.

The nut member 10 according to the embodiment is formed in the manner described above.

Subsequently, the way how the nut member 10 is attached is described together with an adjustment of the optical axis 100 of the lamp member 1.

As illustrated in FIGS. 1A and 1B, the leg portions 15 are inserted into the attachment hole 9 of the attachment portion 6 to attach the nut member 10 to the back side of the reflector 2. Specifically, when the leg portions 15 are inserted into the attachment hole 9, the leg portions 15 come into contact with the edge of the attachment hole 9 and are elastically deformed in directions in which they face each other. The leg portions 15 are pushed into the attachment hole 9 until the flange portion 11 comes into contact with the attachment portion 6. After the leg portions 15 pass through the attachment hole 9, the leg portions 15 are restored and fastened to the attachment portion 6.

In this state, the screw 8 is inserted into the insertion hole 22 of the nut member 10. Specifically, the screw 8 is guided by the funnel-shaped guide portion 20 toward the insertion hole 22 at the center and screwed on the female screw portion 13 in the flange insertion pass 12. At this time, the screw 8 is smoothly screwed on the female screw portion 13 without cutting the nut member 10 since the female screw portion 13 has already been formed.

When the screw 8 inserted into the insertion hole 22 is rotated to move forward relative to the nut member 10, the screw 8 comes into contact with the protrusions 19 of the leg portions 15 in the insertion hole 22. When the screw 8 is rotated further to move forward relative to the nut member 10, the screw 8 moves forward while slightly cutting the protrusions 19 of the leg portions 15 to form a female screw on each protrusion 19. Chips are accumulated in the grooves 18. In this manner, the screw 8 is screwed on the female screw portion 13 of the flange portion 11 and the protrusions 19 of the leg portions 15 in the insertion hole 22, so that the nut member 10 and the screw 8 are attached to the lamp member 1.

When the optical axis 100 of the lamp member 1 is to be adjusted, the screw 8 is rotated to move the nut member 10 forward or rearward relative to the screw 8. The movement of the nut member 10 changes the angle of the lamp member 1 around the support portion 7. Thus, the optical axis 100 is changed and adjusted.

Advantageous effects of the embodiment are described now.

As described above, according to the embodiment, the cylindrical flange insertion pass 12 penetrates through the center of the flange portion 11 of the nut member 10 and the female screw portion 13 has been formed on the inner surface of the flange insertion pass 12 (in the insertion hole 22) before an insertion of the screw 8. Specifically, the female screw portion 13 has already been formed on the inner surface of the flange insertion pass 12. Thus, the screw 8 is screwed on the female screw portion 13 while being guided by the female screw portion 13. The screw 8 is thus can realize excellent handleability at the attachment.

Since the female screw portion 13 is formed not as a result of the screw 8 cutting the inner surface of the flange insertion pass 12, chips are less likely to be produced. Without adhesion of chips, the screw 8 is rotated smoothly, so that the optical axis 100 of the lamp member 1 is easily adjusted. The nut member 10 can realize excellent handability for readjustment after the nut member 10 has been attached.

According to the embodiment, the male screw portion 13 is so formed that a screw thread 14 helically extends one round in a circumferential direction. In this configuration, chips, if produced, are smoothly discharged without adhesion, so that the screw 8 is smoothly rotated and the optical axis 100 of the lamp member 1 can be easily adjusted. The female screw portion 13 has only one screw thread 14. Thus, the screw thread 14 can be easily formed with a small number of split dies if the direction in which the dies are split is set to be an axial direction of the insertion hole 22.

According to the embodiment, the protrusions 19 protruding from the inner surfaces of the leg portions 15 toward the insertion hole 22 longitudinally extend in the front-rear direction along the axial direction of the insertion hole 22. A groove 18 is formed between the protrusions 19. In this configuration, the screw 8 inserted into the insertion hole 22 is guided by the protrusions 19, so that the screw 8 keeps the torque constant at such a level that the rotation of the screw 8 is not hindered. This configuration can thus be stably handled and can realize excellent handleablity. The protrusions 19 come into contact with the screw 8 in the insertion hole 22, whereas the grooves 18 do not come into contact with the screw 8, so that chips are less likely to be produced. Without adhesion of chips, the screw 8 is smoothly rotated and the optical axis 100 of the lamp member 1 can be easily adjusted. This configuration thus can realize excellent handleablity.

According to the embodiment, the guide portion 20 is funnel-shaped, declining toward the center of the flange portion 11 (insertion hole 22). Specifically, the screw 8 is inserted into the insertion hole 22 at the center while being guided by the guide portion 20. Thus, the screw 8 can be easily inserted into the insertion hole 22, so that this configuration can realize excellent handleablity.

According to the embodiment, each groove 18 concaved into the leg portion 15 is formed in the inner surface of the leg portion 15 to extend in the front-rear direction along the axial direction of the insertion hole 22. The groove 18 is open at the end of the insertion hole 22. In this configuration, chips, if produced as a result of the screw 8 slightly cutting the protrusions 19, are accumulated in the grooves 18 and discharged from the end of the insertion hole 22. Without adhesion of chips, the screw 8 is smoothly rotated, so that the optical axis 100 of the lamp member 1 can be easily adjusted. Thus, this configuration can realize excellent handleability.

In this embodiment, two protrusions 19 are formed on each leg portion 15. However, a single protrusion 19 may suffice if it can guide the screw 8 while the screw 8 keeps torque constant. In this embodiment, each groove 18 is formed between two protrusions 19. Instead, open surfaces may be formed on both sides of a single protrusion as long as the surfaces allow chips to be discharged. If a single protrusion is formed on each leg portion, for example, three or more leg portions may be provided for rendering the screw 8 stable. In addition, the male screw portion 13 may have multiple screw threads 14.

Thus far, an embodiment of the present invention is described in detail. The present invention, however, is not limited to the above-described embodiment. The design of the present invention can be modified in various manners without departing from the matter described in the scope of claims. The present invention is thus applicable to lamp members for use as, for example, an automobile, a motorcycle, an aircraft, a ship, or a railway vehicle.

What is claimed is:

1. A vehicle light, comprising:
a nut member comprising a flange portion arranged to be supported by a portion of the vehicle light, and a leg portion protruding toward a first side from the flange portion that is configured to be elastically deformed, and fastened to a portion of the vehicle light,
the vehicle light having an optical axis configured to be adjusted by handling a male screw member inserted into an insertion hole extending from an inside of the flange portion to the leg portion,
wherein a female screw portion is formed in the insertion hole, and
wherein a protrusion protruding from the leg portion toward the insertion hole is formed along an axial direction of the insertion hole.

2. The vehicle light according to claim 1,
wherein the female screw portion has a screw thread extending one round in a circumferential direction.

3. The vehicle light according to claim 2,
wherein a guide portion by which the male screw member is to be guided is disposed on a second side of the flange portion.

4. The vehicle light according to claim 3,
wherein a groove formed in an inner side of the leg portion extends along an axial direction of the insertion hole and is open at an end of the insertion hole.

5. The vehicle light according to claim 2,
wherein a groove formed in an inner side of the leg portion extends along an axial direction of the insertion hole and is open at an end of the insertion hole.

6. The vehicle light according to claim 1,
wherein a guide portion by which the male screw member is to be guided is disposed on a second side of the flange portion.

7. The vehicle light according to claim 6,
wherein a groove formed in an inner side of the leg portion extends along an axial direction of the insertion hole and is open at an end of the insertion hole.

8. The vehicle light according to claim 1,
wherein a groove formed in an inner side of the leg portion extends along an axial direction of the insertion hole and is open at an end of the insertion hole.

9. The vehicle light according to claim 1,
wherein a groove formed in an inner side of the leg portion extends along an axial direction of the insertion hole, and along an entire length of the insertion hole, and is open at an end of the insertion hole.

10. A nut member comprising:
a flange portion;
a leg portion protruding toward a side from the flange portion and configured to be elastically deformed,
an insertion hole;
a female screw portion formed in the insertion hole that is configured to receive a male screw member; and
a protrusion protruding from the leg portion toward the insertion hole and formed along an axial direction of the insertion hole.

11. A vehicle light comprising:
a reflector;
a light source connected to a front side of the reflector;
an attachment portion connected to the reflector;
a nut member connected to the attachment portion, the nut member comprising:
  a flange portion,
  a leg portion protruding toward a side from the flange portion and configured to be elastically deformed,
  an insertion hole,
  a female screw portion formed in the insertion hole,
  a protrusion protruding from the leg portion toward the insertion hole and formed along an axial direction of the insertion hole; and
a male screw member inserted into the nut member,
wherein the vehicle light includes an optical axis that is adjustable by screwing the male screw member inserted into the insertion hole such that the light source and the reflector are tilted.

* * * * *